March 31, 1953     C. HERZOG     2,633,565
ARMATURE LOADING AND POSITION INDICATING APPARATUS
Filed Sept. 21, 1950     3 Sheets-Sheet 2
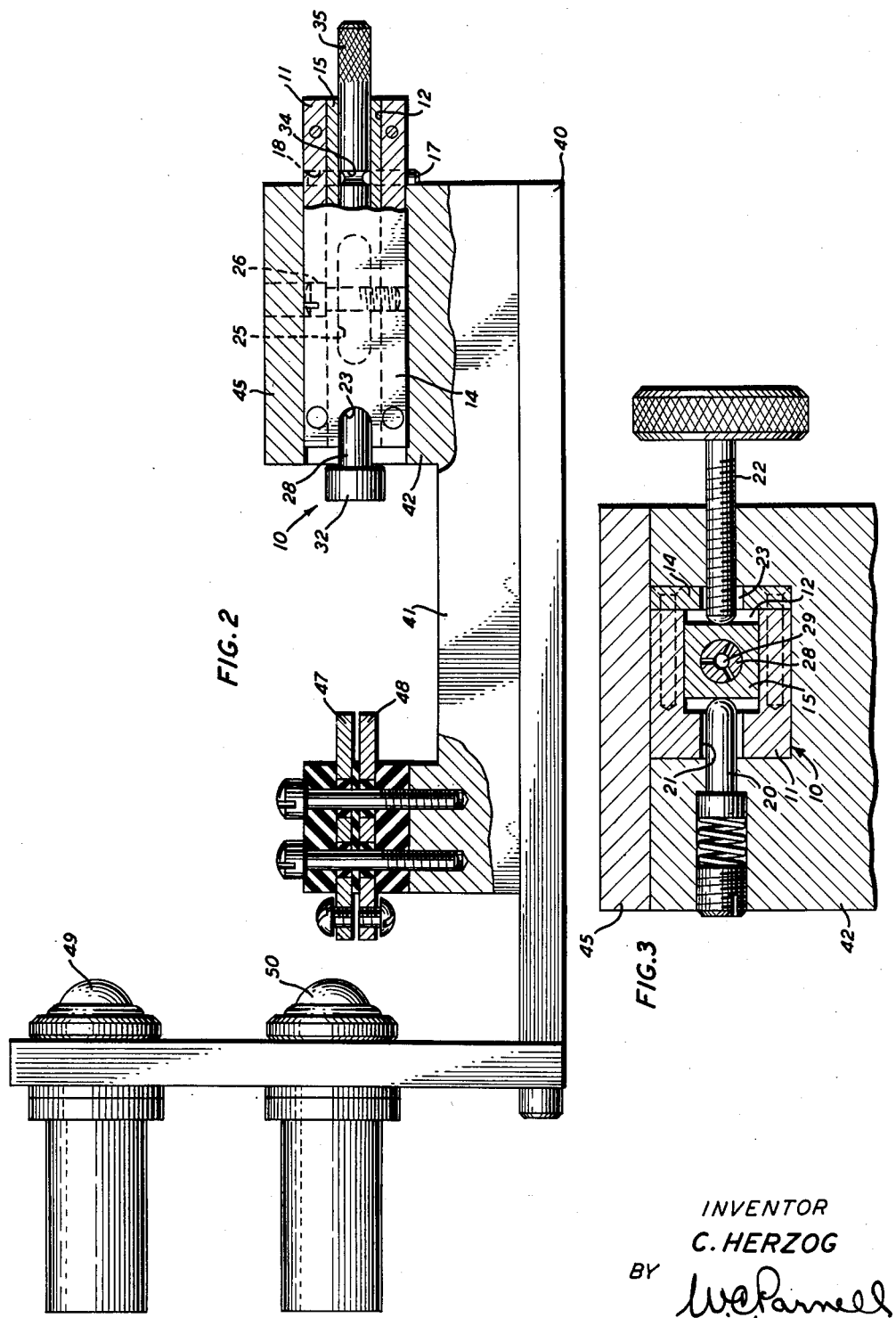
INVENTOR
C. HERZOG
BY
ATTORNEY March 31, 1953 C. HERZOG 2,633,565
ARMATURE LOADING AND POSITION INDICATING APPARATUS
Filed Sept. 21, 1950 3 Sheets-Sheet 3
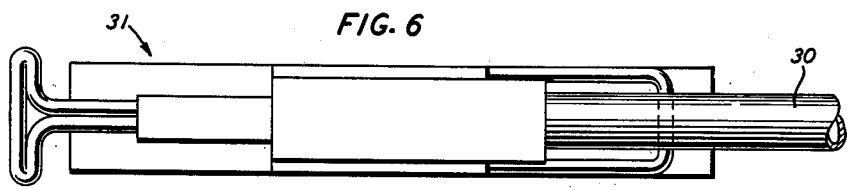
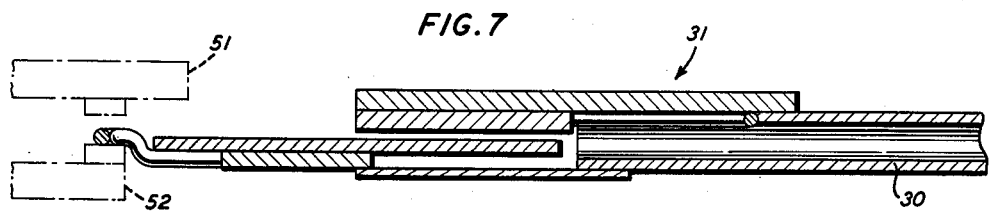
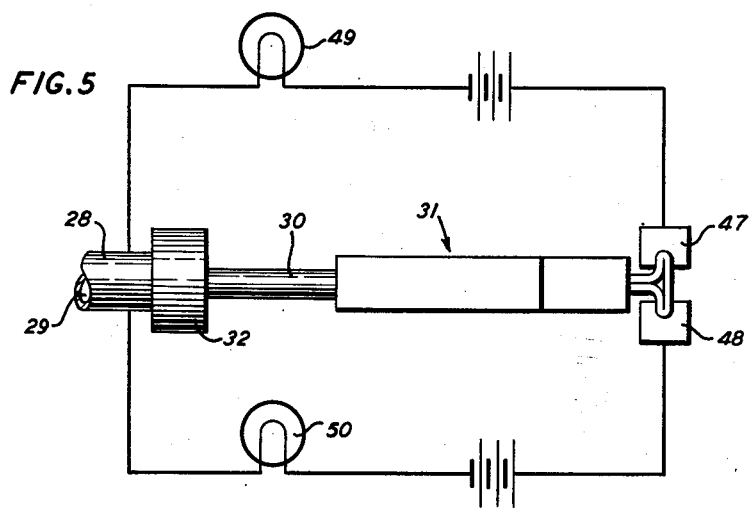
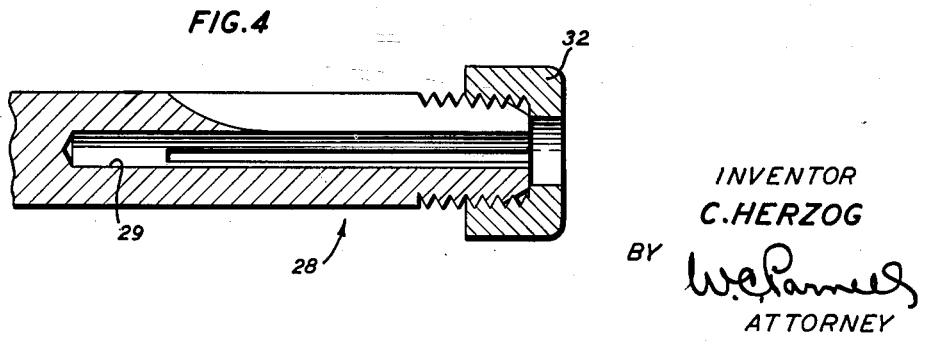
INVENTOR
C. HERZOG
BY
ATTORNEY Patented Mar. 31, 1953

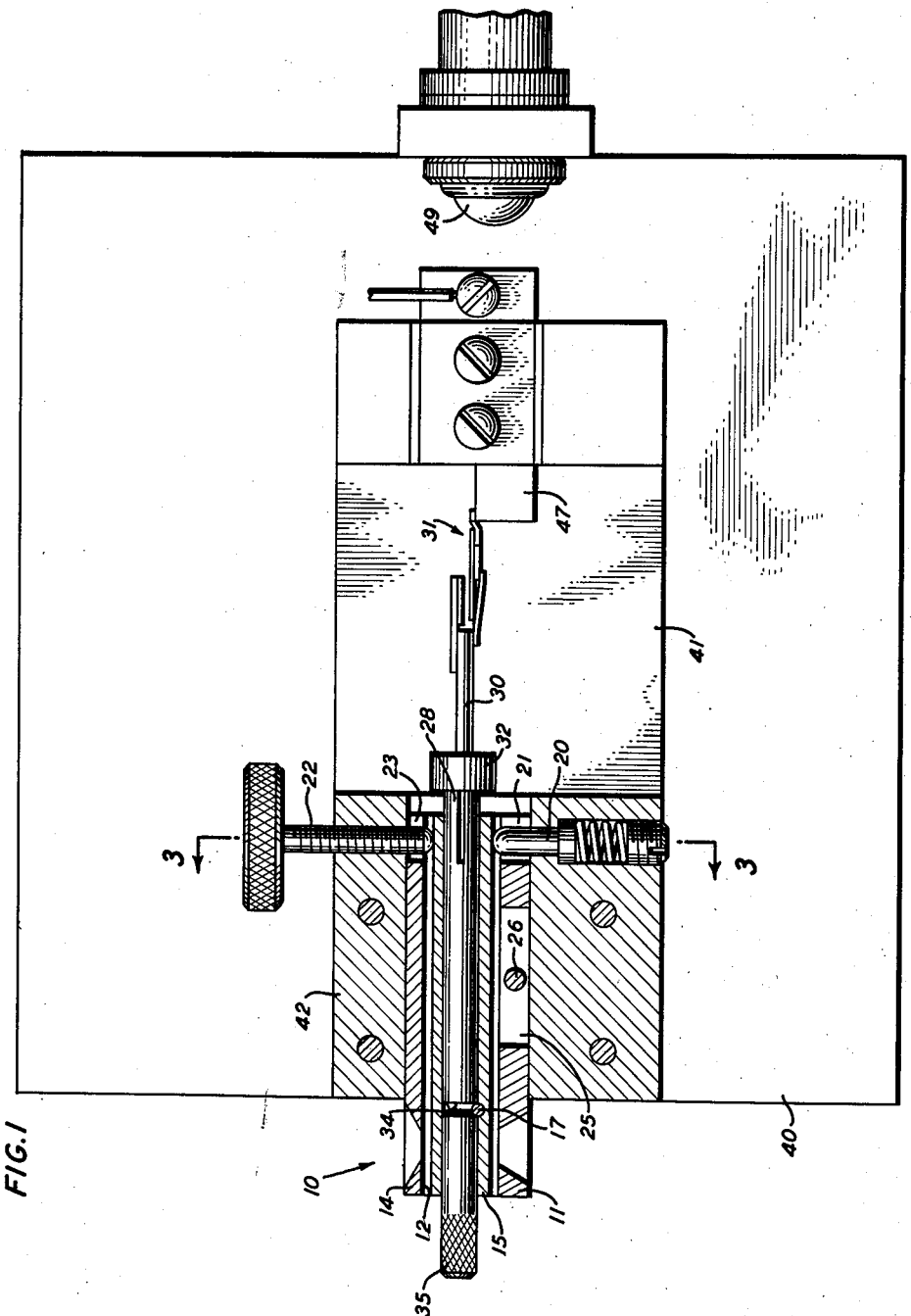

2,633,565

UNITED STATES PATENT OFFICE 2,633,565

ARMATURE LOADING AND POSITION INDICATING APPARATUS

Carl Herzog, Belleville, N. J., assignor to Western Electric Company, Incorporated, New York, N. Y., a corporation of New York Application September 21, 1950, Serial No. 186,003

3 Claims. (Cl. 340—265)

This invention relates to article loading apparatus and more particularly to apparatus for use in accurately positioning armatures for mounting in glass envelopes during the manufacture of mercury switches.

Mercury switches of the type used in the telephone art include two pairs of contacts, mounted at selectively spaced positions in one end of a sealed envelope or tube, and an armature supported by a metal tube sealed in the opposite end of the glass envelope or tube is required to be mounted in place so that its contact engaging end will normally engage one pair of contacts, and when actuated, the other pair.

In applicant's copending application, Serial No. 186,005, filed September 21, 1950, it is illustrated how a holder, with reference surfaces to register with reference surfaces in a support accurately located with respect to the center line of the glass envelope, properly positions the pairs of contacts for sealing in one end of the glass envelope. In actual practice, the reference surfaces of the support for the contact holder are to be employed for a holder for the armature. In this manner the contacts having been mounted in the glass tube at known positions with respect to reference surfaces of the support, the armature may be accurately mounted in the other end of the glass tube if it is possible to accurately locate the armature at a known position with respect to the reference surfaces of the support.

It is the object of the present invention to provide an apparatus which is simple in structure yet highly efficient in loading articles such as armatures in known positions with respect to reference surfaces.

With this and other objects in view the invention comprises an article loading apparatus including a holder with a main member having reference surfaces and made hollow for a chuck which removably holds the article while an intermediate member supports the chuck for movement in different directions to locate the article in a given position relative to the reference surfaces.

More specifically, the holder includes a rectangular hollow member, the outer surfaces of which are disposed in given positions with respect to each other to correspond to reference surfaces of a support in which the holder is mounted while the article or armature is sealed within a glass envelope in the formation of a mercury switch. The present embodiment of the invention, however, deals with the mounting of the armature within the holder prior to the time the armature is located in and made a part of the glass tube. Therefore, a supporting frame is recessed at one position to provide reference surfaces corresponding to the reference surfaces of the support, and has spaced contacts located known distances from its reference surfaces corresponding to the positions of the contacts in the mercury switch to be engaged by the armature. Therefore, with a chuck for the armature, supported for rotation about its axis in the element and rocked with the element laterally about a pivot, the armature may be moved relative to the contacts and by including the contacts together with the armature in circuits with indicating units such as lamps, the operator may continue adjustment of the parts of the holder, namely, the chuck and the hollow element, until the armature is accurately located within the holder. The operation of a screw clamps the chuck and the element against movement, thus locking the armature at a known position with respect to the reference surfaces of the holder.

Other objects and advantages will be apparent from the following detailed description when considered in conjunction with the accompanying drawings wherein:

Fig. 1 is a top plan view of the apparatus, portions therefor being shown in section;

Fig. 2 is a side elevational view of the apparatus, portions therefor being shown in section;

Fig. 3 is an enlarged fragmentary sectional view taken along the line 3—3 of Fig. 1;

Fig. 4 is an enlarged detailed sectional view of the chuck;

Fig. 5 is a schematic illustration of the armature in the chuck illustrating the wiring diagram;

Fig. 6 is an enlarged top plan view of the main portion of the armature; and

Fig. 7 is a longitudinal sectional view of the armature illustrating its normal position with respect to the contacts in the mercury switch of which it is to be a part.

Referring now to the drawings, the apparatus includes a holder indicated generally at 10 including a main member 11, U-shaped in cross section, with a center hollow portion 12 covered by a plate 14. A hollow element 15, square in cross section as illustrated in Fig. 3, is positioned within the main member for sliding movement about the axis of a pin 17 which extends through an aperture 18, Fig. 2, in the main member 11 and beneath the main member to serve as a stop as hereinafter described. The element 15 is normally urged counter-clockwise, Fig. 1 by a spring-pressed plunger 20 which enters a cutaway portion 21 of the main member while a thumbscrew 22 may be actuated to forcibly move the element clockwise, the screw entering a cutaway portion 23 of the main member 11. The main member 11 is also provided with a cutaway portion 25 of a given length whereby the rotation of a locking screw 26, shown in detail in Figs. 1 and 2, may cause the main member 11 to grip the intermediate element 15 and lock it against movement.

A chuck 28 is of the structure shown in Fig. 4 with an opening 29 to receive a tube 30 of an armature 31. The jaws of the chuck may be closed to grip the tube 30 through rotation of the head 32 of the chuck. The chuck 28, particularly the spindle-like portion thereof, is disposed in the aperture of the element 15 and is provided with an annular groove 34 adjacent the pin 17 whereby the chuck may be rotated within the element 15, but held by the pin against longitudinal movement. The outer end of the spindle of the chuck is knurled at 35 to assist in manually rotating or rocking the chuck to move the armature in a proper position.

A table 40 supports a frame 41 having a vertical portion at one end which may be described as a receptacle 42 in that it has an aperture corresponding in close sectional contour to that of the main member 11 of the holder providing reference surfaces to engage the corresponding reference surfaces of the holder. The receptacle 42 is provided with the necessary apertures for the spring-pressed plunger 20 and the adjusting screw 22 as shown in Figs. 1 and 3. A cover 45 is provided for the receptacle 42 completing the recess with its reference surfaces to accurately locate the main member of the holder in a known position.

Another vertical portion of the frame 41 supports a pair of contacts 47 and 48 mounted known distances with respect to each other and suitably insulated from each other and the frame. The contacts are included in the electrical circuits with their indicating units or lamps 49 and 50 as illustrated in Fig. 5, these circuits including the armatures 31.

The armature 31 is shown in detail in Figs. 6 and 7, its particular structure being unimportant as far as the invention is concerned but of interest in determining the problem of mounting the armature accurately within a glass tube relative to pairs of contacts 51 and 52. The contacts 47 and 48 are disposed with respect to each other the same distance the contacts 52 are disposed with respect to each other in a glass tube of the mercury switch.

Considering now the operation of the apparatus, the armature to be mounted is positioned within the chuck 28 and locked in place. The holder is disposed in the receptacle 42, moved forwardly therein until the pin 17 abuts the adjacent surface of the receptacle, as shown in Fig. 2, after which the necessary adjustments are made. It is preferred that the screw 22 be loosened or moved outwardly before the holder with the armature is inserted in the receptacle so that the outer end of the armature adjacent the contacts 47 and 48 will be positioned out of engagement therewith through the action of the spring-pressed plunger 20. The operator then starts adjustment of both the chuck 28 and the adjusting screw 22. By moving these two elements, the outer end of the armature will be moved into engagement with either or both of the contacts 47 and 48. If only one of the indicating units or lamps 49 or 50 lights, the operator will know that the armature must be rotated and also the direction of rotation. This adjustment is made through rocking motion of the chuck. If, during the rocking motion of the chuck, both lamps fail to illuminate, the operator will know that the adjusting screw should be operated against the force of the plunger 20 to move the armature closer to the contacts. These adjustments are continued until both lights are illuminated. To be sure of the desired location of the armature, the operator may loosen the screw 22 to determine if both lights go out at the same time. If not, additional adjustment can be made until this takes place. It is therefore possible to make exceedingly fine adjustments of the armature within the holder particularly relative to the reference surfaces thereof so that when the armature is mounted within the glass tube to form a part of the mercury switch, its location with respect to the contacts 50 and 51 will be known to be accurate.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. An armature loading apparatus comprising a holder having reference surfaces and a chuck to removably hold an armature supported by the holder for movement in different directions relative to the reference surfaces, a receptacle for the holder having reference surfaces to be engaged by the respective reference surfaces of the holder, and electrical circuits including energizable indicating units and contacts, disposed at known positions relative to the reference surfaces of the holder, to be engaged by the armature during movement of the chuck therewith whereby the armature may be located in a known position relative to the reference surfaces of the holder.

2. An armature loading apparatus comprising a holder having reference surfaces and a chuck to removably hold an armature supported by the holder for movement in different directions relative to the reference surfaces, a receptacle for the holder having reference surfaces to be engaged by the respective reference surfaces of the holder, electrical circuits including energizable indicating units and contacts, disposed at known positions relative to the reference surfaces of the holder to be engaged by the armature during movement of the chuck therewith whereby the armature may be located in a known position relative to the reference surfaces of the holder, and a clamping mechanism actuable while the holder is in the receptacle to clamp the chuck with the armature against movement relative to the reference surfaces.

3. An armature loading apparatus comprising a frame having a receptacle at one position with reference surfaces and a support at another position with respect to the reference surfaces, contacts mounted on the support at known positions relative to the reference surfaces and insulated from the support, an electrical circuit for each contact including a signal energizable when the circuit is closed, a holder having a hollow main member receivable in the receptacle and having reference surfaces to engage the reference surfaces of the receptacle, a chuck to removably hold an armature, an element movably disposed in the main member to rotatably support the chuck, a spindle carried by the main member, to hold the chuck against longitudinal movement, serve as a pivot for the element and to locate the holder in the receptacle and thereby locate the armature relative to the contacts whereby the chuck may be rocked and moved about the pivot for the element until the circuits are closed to indicate the desired position of the armature relative to the reference surfaces.

CARL HERZOG.

REFERENCES CITED

The following references are of record in the file of this patent:

UNITED STATES PATENTS

| Number | Name | Date |
|---|---|---|
| 2,055,175 | Franz | Sept. 22, 1936 |
| 2,069,563 | Segal | Feb. 2, 1937 |
| 2,256,120 | Lovenston | Sept. 16, 1941 |
| 2,435,514 | Ross | Feb. 3, 1948 |
| 2,527,150 | Quinlan | Oct. 24, 1950 |